United States Patent
Hsu

(10) Patent No.: US 8,602,079 B2
(45) Date of Patent: Dec. 10, 2013

(54) APPARATUS AND METHOD FOR MANUFACTURING ROLLER

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/586,803

(22) Filed: Aug. 15, 2012

(65) Prior Publication Data

US 2013/0299069 A1 Nov. 14, 2013

(30) Foreign Application Priority Data

May 11, 2012 (TW) .............................. 101116990 A

(51) Int. Cl.
*B29C 65/00* (2006.01)
(52) U.S. Cl.
USPC ........... 156/450; 156/449; 264/219; 264/220; 264/293
(58) Field of Classification Search
USPC .......... 264/106, 107, 219, 220, 293; 156/184, 156/185, 187, 191, 192, 443, 446–451; 219/121.6, 121.67, 121.68, 121.69, 219/121.72, 121.73, 121.75, 121.85
See application file for complete search history.

(56) References Cited

U.S. PATENT DOCUMENTS

| | | | | |
|---|---|---|---|---|
| 4,836,874 A | * | 6/1989 | Foster | 156/209 |
| 4,925,506 A | * | 5/1990 | Baker | 156/64 |
| 5,174,937 A | * | 12/1992 | Tamura et al. | 264/106 |
| 6,023,040 A | * | 2/2000 | Zahavi et al. | 219/121.69 |
| 8,277,717 B2 | * | 10/2012 | Heidari | 264/293 |
| 2008/0110869 A1 | * | 5/2008 | Chen | 219/121.75 |

* cited by examiner

*Primary Examiner* — Katarzyna Wyrozebski Lee
*Assistant Examiner* — Carson Gross
(74) *Attorney, Agent, or Firm* — Altis Law Group, Inc.

(57) ABSTRACT

An apparatus for manufacturing a roller includes a loading plate, a polishing device, a processing device, a hot pressing device, a mounting device, and a cutting device. The loading plate loads a preprocessed metal plate having a preprocessed molding surface. The polishing device polishes the preprocessed molding surface to obtain a polished molding surface. The processing device forms molding patterns on the polished molding surface to obtain a metal plate with a molding surface defining the molding patterns. The hot pressing device forms impression patterns on a preprocessed resin film to obtain a resin film by pressing the metal plate and the preprocessed resin film together. The mounting device mounts the resin film to a rolling surface of a main body until the resin film winds around the rolling surface. The cutting device cuts the resin film.

9 Claims, 5 Drawing Sheets

APPARATUS AND METHOD FOR MANUFACTURING ROLLER

BACKGROUND

1. Technical Field

The present disclosure relates to an apparatus and a method for manufacturing a roller.

2. Description of Related Art

Optical films define a number of micro structures. One method for forming the micro structures is a roll forming process using a metal roller. The metal roller has a rolling surface defining impression patterns mating with the micro structures. The impression patterns are formed by a laser knife. However, the roller in the roll forming process has a low forming efficiency and has a relatively high cost.

Therefore, it is desirable to provide an apparatus and a method for manufacturing a roller that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
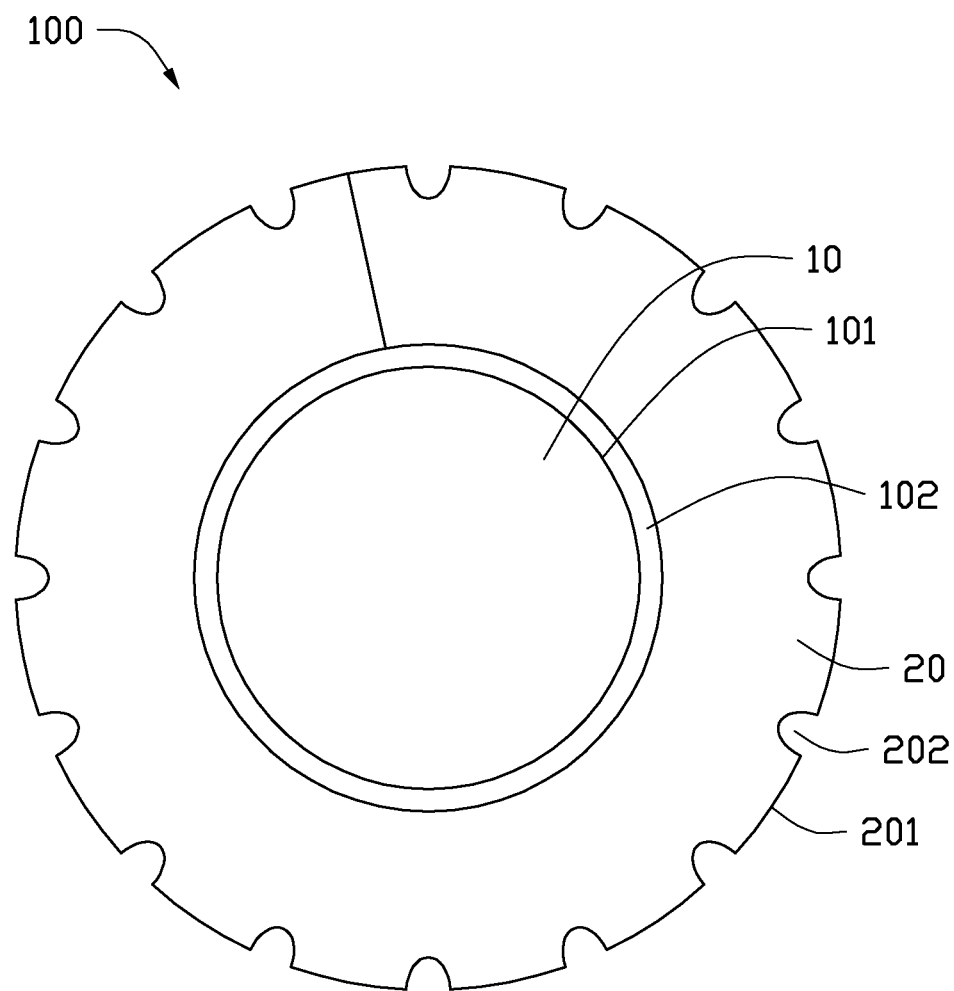
FIG. 1 is a schematic view of a roller, according to an exemplary embodiment.
Figure 2:
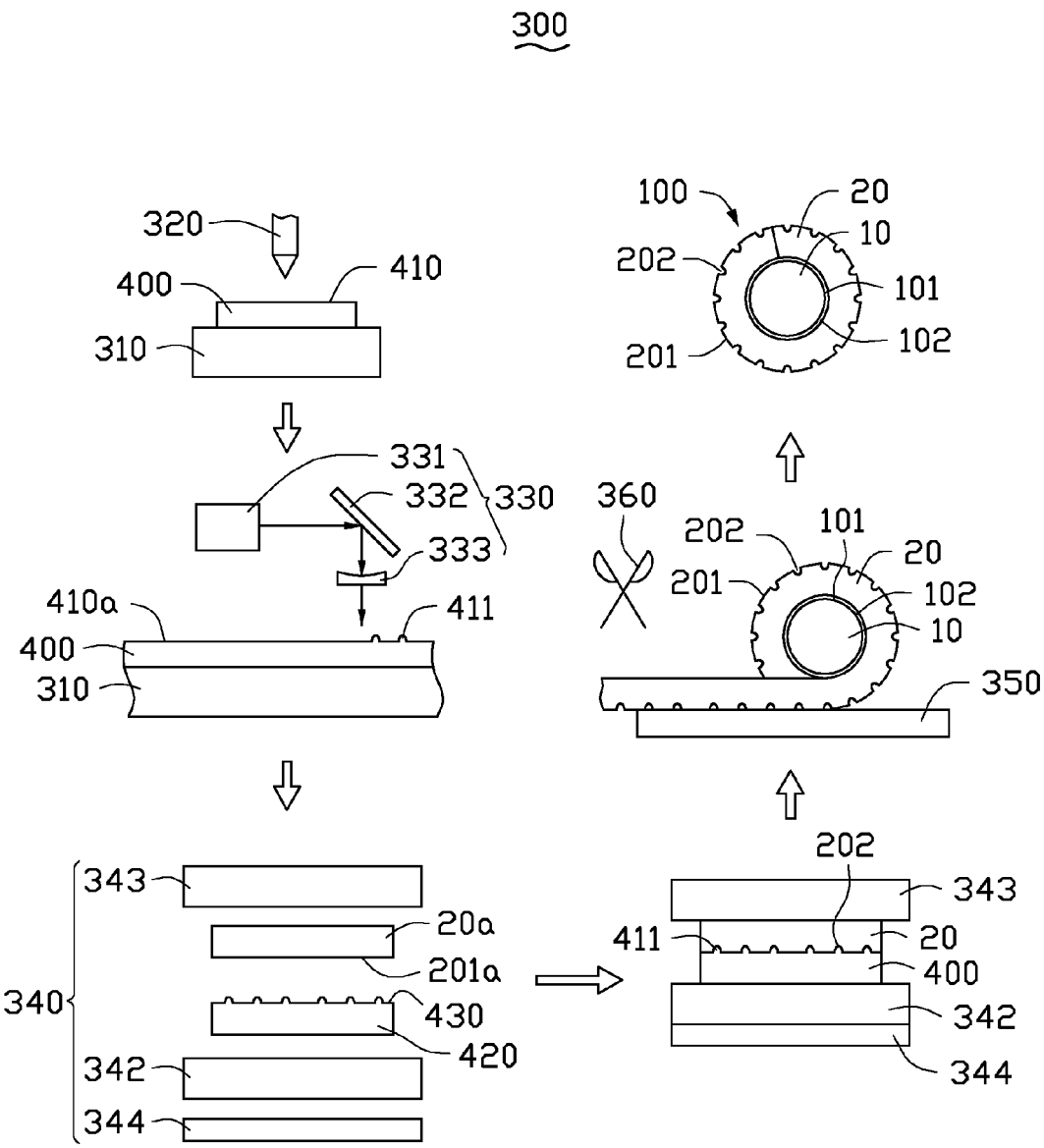
FIG. 2 is a schematic view of an apparatus for manufacturing the roller of FIG. 1, according to an exemplary embodiment.

Referring to FIG. 1, a roller 100, according to an exemplary embodiment, includes a cylindrical main body 10 and a flexible resin film 20. The main body 10 includes a rolling surface 101, and can be made of stainless steel or other metals. The rolling surface 101 is coated with an adhesive glue 102. The resin film 20 is wound around and fixed to the rolling surface 101 through the adhesive glue 102. The resin film 20 includes an outer surface 201 opposite to the main body 10. The outer surface 201 defines a number of impression patterns 202. In the embodiment, the impression patterns 202 are micro-grooves.

The resin film 20 is made of a polymer resin having the molecular chain with fluorine element, such as ethylene tetrafluoroethylene (ETFE) or poly tetrafluoroethylene (PTFE), therefore optical films are easily separated from the resin film 20, and the quality of the optical films can be greatly improved.

An apparatus 300 for manufacturing the roller 100, according to an exemplary embodiment, includes a loading plate 310, a polishing device 320, a processing device 330, a hot pressing device 340, a mounting device 350, and a cutting device 360.

The loading plate 310 loads a preprocessed metal plate 400. The preprocessed metal plate 400 has a preprocessed molding surface 410 opposite to the loading plate 310.

The polishing device 320 is used for polishing the preprocessed molding surface 410 to obtain a smooth polished molding surface 410a. In the embodiment, the polishing device 320 is a diamond knife.

The processing device 330 forms a number of molding patterns 411 mating with the impression patterns 202 on the polished molding surface 410a, thus obtaining a metal plate 420 with a molding surface 430. The molding patterns 411 is on the molding surface 430. In the embodiment, the molding patterns 411 are micro-dots.

The processing device 330 includes a laser emitter 331, a reflector 332, and a converging lens 333. The laser emitter 331 is used for emitting laser beams. The emitting direction of the laser beams is substantially parallel to the polished molding surface 410a. The reflector 332 reflects the laser beams to the converging lens 333. The converging lens 333 converges the laser beams from the reflector 332 on the polished molding surface 410a to form the molding patterns 411. In other embodiments, the reflector 332 and the converging lens 333 can be omitted, and the emitting direction of the laser beams is substantially perpendicular to the polished molding surface 411. If the molding patterns 411 are V-shaped grooves, the processing device 330 can be a diamond knife having a V-shaped blade.

The hot pressing device 340 forms the impression patterns 202 on a preprocessed outer surface 201a of a preprocessed resin film 20a to obtain the resin film 20 with the outer surface 201.

The hot pressing device 340 includes a first pressing plate 342, a second pressing plate 343, and a temperature adjusting device 344. The metal plate 420 and the preprocessed film 20a are sandwiched between the first pressing plate 342 and the second pressing plate 343. The metal plate 420 is adjacent to the first pressing plate 342, and the preprocessed film 20a is adjacent to the second pressing plate 343. The preprocessed outer surface 201a is in contact with the molding surface 430. The second pressing plate 343 is used for pressing the preprocessed resin film 20a on the molding surface 430. The temperature adjusting device 344 is used for heating or cooling the preprocessed resin film 20a. In the embodiment, the temperature adjusting device 344 is directly positioned under the first pressing plate 342.

The working process of the hot pressing device 340 is described as follows: the temperature adjusting device 344 heats the preprocessed resin film 20a to a half-fused state at a predetermined temperature (such as about 200 Celsius degrees). After that, the preprocessed resin film 20a is kept constant at the predetermined temperature, and the second pressing plate 343 presses the preprocessed resin film 20a at a predetermined pressure for a predetermined period (such as about 5 minutes to about 10 minutes). And then the preprocessed resin film 20a is kept constant at the predetermined pressure, the temperature adjusting device 344 cools the preprocessed resin film 20a quickly to obtain the resin film 20 with the outer surface 201.

The mounting device 350 includes a working platform 351. The mounting device 350 mounts the resin film 20 on the rolling surface 101. The resin film 20 is positioned on the working platform 351, and the outer surface 201 faces the working platform 351. The rolling surface 101 is coated with the adhesive glue 102, and the main body 10 presses one end of the resin film 20, then the main body 10 is rolled on the resin film 20 to make the resin film 20 wind around the rolling surface 101.

The cutting device 360 cuts the resin film 20 to make the length of the resin film 20 substantially equal to the perimeter of the rolling surface 101. Finally, th roller 100 is obtained.

Figure 3:
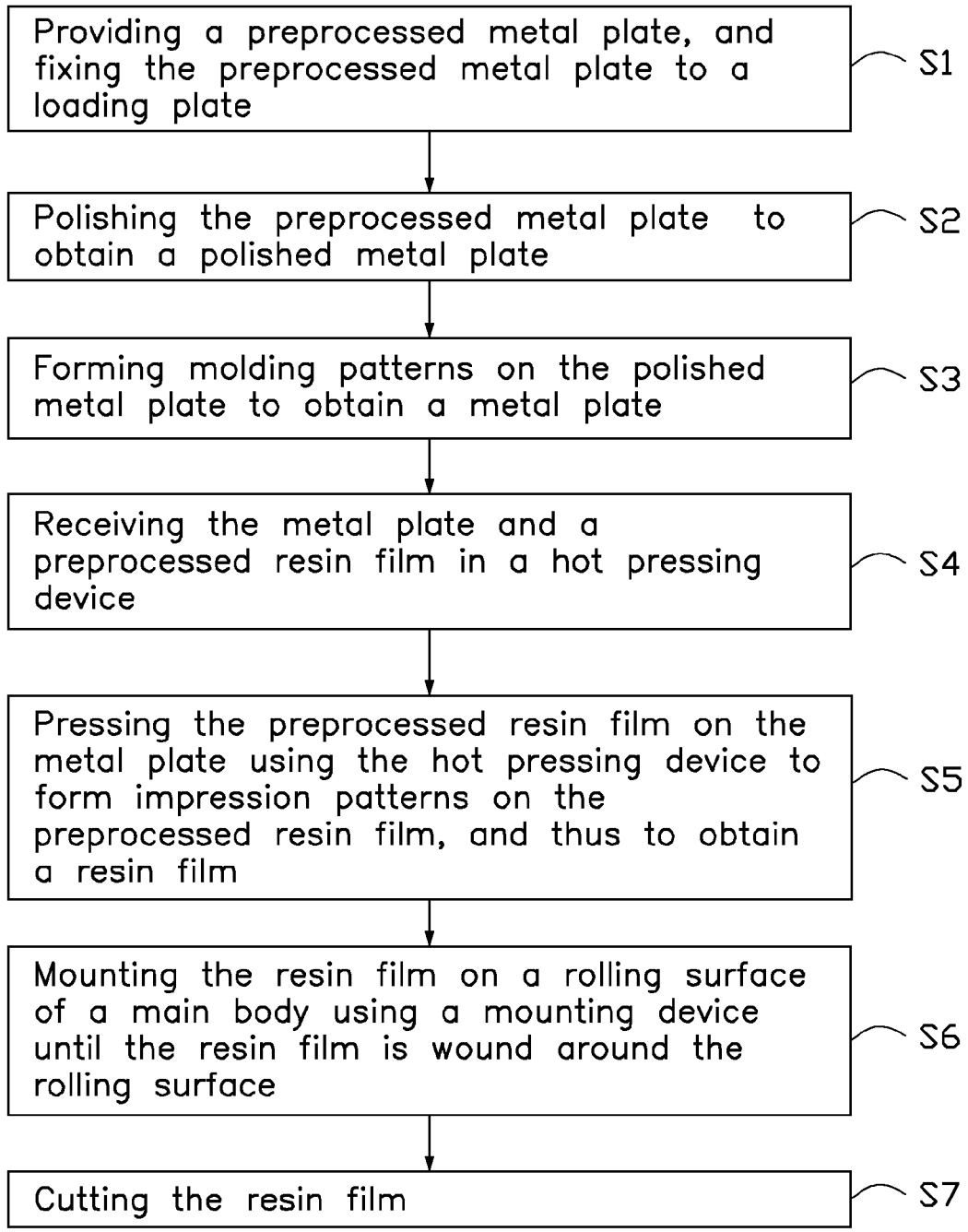
FIG. 3 is a flowchart of a method for manufacturing the roller of FIG. 1, according to an exemplary embodiment, the method including a step of making a resin film and a step of winding the resin film around a main body.

Referring to FIG. 3, a method for manufacturing the roller 100 using the apparatus 200 includes the following steps.

In step S1, the preprocessed metal plate 400 is positioned on the loading plate 310. The preprocessed metal plate 400 has a preprocessed molding surface 410 opposite to the loading plate 310.

In step S2, the preprocessed molding surface 410 is polished using the polishing device 320, and thus the polished molding surface 410a is obtained.

In step S3, the polished molding surface 410a is processed to form a number of molding patterns 411, and thus the metal plate 420 with the molding surface 430 is obtained.

In step S4, the metal plate 420 is removed from the loading plate 310, and the metal plate 420 and the preprocessed resin film 20a are received in the hot pressing device 340.

In step S5, the first impression patterns 202 are formed on the preprocessed outer surface 201a using the hot pressing device 340 to obtain the resin film 20 with the outer surface 201.

In step S6, the resin film 20 is wound around the rolling surface 101 using the mounting device 350.

In step S7, the resin film 20 is cut by the cutting device to make the length of the resin film 20 substantially equal to the perimeter of the rolling surface 101.

Figure 4:
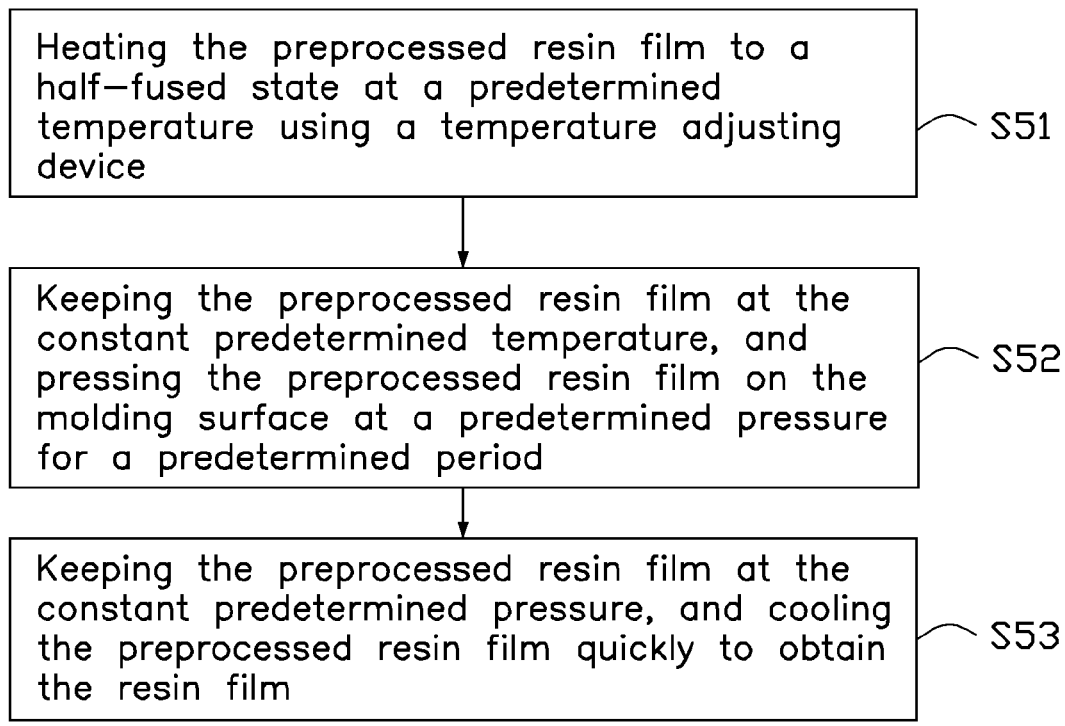
FIG. 4 is a flowchart showing sub-steps of the step of making the resin film in FIG. 3.

Referring to FIG. 4, step S5 includes the following sub-steps.

In step S51, the preprocessed resin film 20a is heated to a half-fused state at a predetermined temperature using the temperature adjusting device 344. In the embodiment, the predetermined temperature is about 220 Celsius degrees.

In step S52, the preprocessed resin film 20a are kept constant at the predetermined temperature (i.e. about 200 degrees), and the second pressing plate 343 presses the preprocessed resin film 20a at a predetermined pressure for a predetermined period (such as 5 minutes to 10 minutes).

In step S53, the preprocessed resin film 20a is kept constant at the predetermined pressure, the temperature adjusting device 344 cools the preprocessed resin film 20a quickly to obtain the resin film 20 with the outer surface 201.

In other embodiments, the order of step S6 and step S7 can be interchanged.

Figure 5:
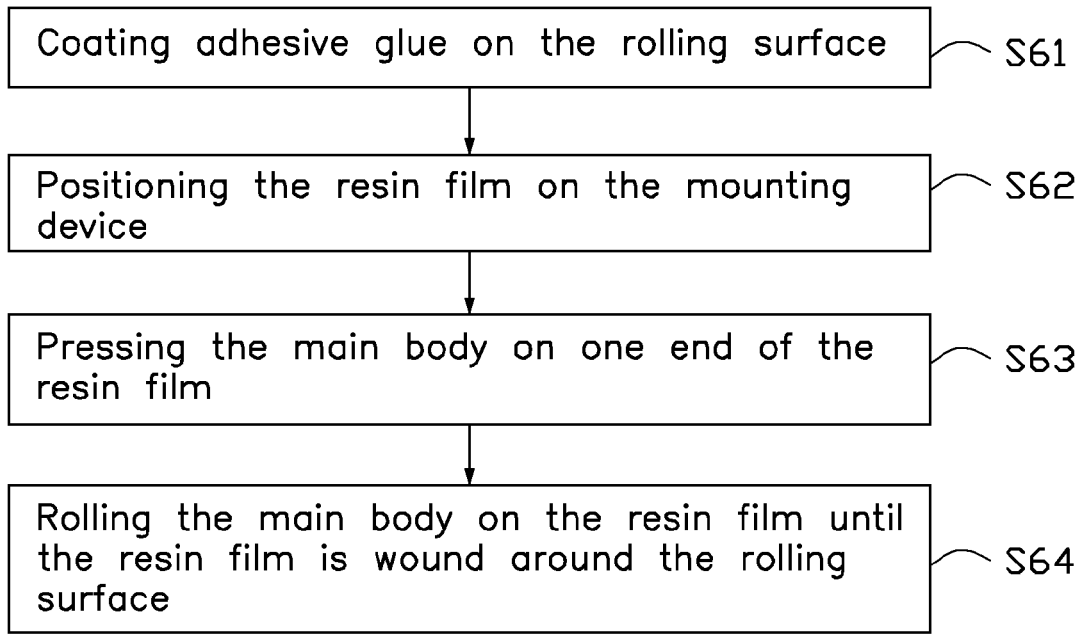
FIG. 5 is a flowchart showing sub-steps of the step of winding the resin film around the main body in FIG. 3.

Referring to FIG. 5, the step S6 further includes the following sub-steps.

In step S61, the rolling surface 101 is coated with the adhesive glue 102.

In step S62, the resin film 20 is positioned on the mounting device 350, and the outer surface 201 is opposite to the main body 10.

In step S63, the main body 10 presses on one end of the resin film 20, and thus the end of the resin film 20 is adhered on the rolling surface 101.

In step S64, the main body 10 is rolled on the resin film 20 until the resin film 20 is wound around the rolling surface 101.

By employing the apparatus 100 and the above described method, the impression pattern 202 can be directly manufactured on a plane-shaped preprocessed resin film 20a to obtain a resin film 20. The resin film 20 is wound to be mounted on the main body 10. Therefore, the manufacturing efficiency will be greatly improved. Furthermore, when the impression patterns 202 of one resin film 20 are destroyed, the destroyed resin film 20 can be removed from the main body 10. Another new resin film 20 can be adhered to the main body 10 to form a new roller 100. Therefore, the main body 10 can be used more times, and the roller 100 has a relatively low cost.

The above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An apparatus for manufacturing a roller, comprising:
   a loading plate configured for loading a preprocessed metal plate, wherein the preprocessed metal plate has a preprocessed molding surface opposite to the loading plate;
   a polishing device configured for polishing the preprocessed molding surface to obtain a smooth polished molding surface;
   a processing device configured for forming molding patterns on the polished molding surface to obtain a metal plate with a molding surface defining the molding patterns;
   a hot pressing device configured for forming impression patterns on a preprocessed resin film to obtain a resin film by pressing the metal plate and the preprocessed resin film together;
   a mounting device configured for mounting only the resin film to a rolling surface of a main body until the resin film is wound around the rolling surface; and
   a cutting device configured for cutting the resin film.

2. The apparatus of claim 1, wherein a length of the cut resin film is substantially equal to a perimeter of the rolling surface.

3. The apparatus of claim 1, wherein the processing device comprises a laser emitter configured for emitting laser beams to form the molding patterns on the polished molding surface, and a transmitting direction of the laser beams is substantially perpendicular to the polished molding surface.

4. The apparatus of claim 1, wherein the processing device comprises a laser emitter and a reflector, the laser emitter is configured for emitting laser beams, and the reflector is configured for reflecting the laser beams to the polished molding surface.

5. The apparatus of claim 4, wherein a transmitting direction of the laser beams is substantially parallel to the polished molding surface.

6. The apparatus of claim 5, wherein the processing device further comprises a converging lens configured for converging the laser beams on the polished molding surface.

7. The apparatus of claim 1, wherein the processing device comprises a diamond knife.

8. The apparatus of claim 1, wherein the mounting device comprises a working platform.

9. The apparatus of claim 1, wherein the hot pressing device comprises a first pressing plate, a second pressing plate, and a temperature adjusting device; the first pressing plate and the second pressing plate are configured for cooperatively pressing the metal plate and the preprocessed resin film therebetween; and the temperature adjusting device is configured for heating or cooling the preprocessed resin film.

* * * * *